US012567893B2

(12) United States Patent　　(10) Patent No.:　US 12,567,893 B2
Lu et al.　　(45) Date of Patent:　Mar. 3, 2026

(54) BASEBAND UNIT, RADIO UNIT AND METHODS IN A WIRELESS COMMUNICATIONS NETWORKS

(71) Applicant: Telefonaktiebolaget LM Ericsson (publ), Stockholm (SE)

(72) Inventors: Chenguang Lu, Sollentuna (SE); Yezi Huang, Taby (SE); Miguel Berg, Sollentuna (SE); Niklas Wernersson, Kungsangen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 165 days.

(21) Appl. No.: 18/280,025

(22) PCT Filed: Mar. 2, 2021

(86) PCT No.: PCT/SE2021/050179

§ 371 (c)(1),
(2) Date: Sep. 1, 2023

(87) PCT Pub. No.: WO2022/186741

PCT Pub. Date: Sep. 9, 2022

(65) Prior Publication Data

US 2024/0072861 A1　　Feb. 29, 2024

(51) Int. Cl.
H04B 7/06　　(2006.01)
H04L 25/02　　(2006.01)

(52) U.S. Cl.
CPC ....... H04B 7/0617 (2013.01); H04L 25/0224 (2013.01)

(58) Field of Classification Search
CPC .................................................... H04B 7/0617
(Continued)

(56) References Cited

U.S. PATENT DOCUMENTS

| 5,822,380 A | * | 10/1998 | Bottomley | .......... | H04L 25/0204 |
| | | | | | 455/303 |
| 2009/0131011 A1 | * | 5/2009 | Asokan | .................. | H04B 1/712 |
| | | | | | 455/347 |

(Continued)

OTHER PUBLICATIONS

M. Garyantes, O-RAN Frontal Working Group Control, User and Synchronization Plane Specification, Apr. 4, 2018 (Apr. 4, 2018), pp. 1-258, XP055612006.

(Continued)

*Primary Examiner* — Lihong Yu
(74) *Attorney, Agent, or Firm* — FBT Gibbons LLP

(57)　　　　　ABSTRACT

A method performed by a Baseband Unit, BBU, for assisting a Radio Unit, RU, to perform beamforming for a communication between a User Equipment, UE, and a base station in a wireless communications network using a multiple antenna system for is provided. The BBU and the RU are associated with the base station. The BBU obtains (302) channel taps related to a number of subcarriers. The BBU selects (303) a subset of the channel taps. The BBU sends (304) to the RU, the selected subset of the channel taps and information identifying the selected subset of channel taps. The selected subset of channel taps and information identifying the selected subset of channel taps assists the RU to perform beamforming for the communication between the UE and the base station.

6 Claims, 14 Drawing Sheets

---

301. Obtain frequency domain channel values related to each respective subcarrier out of a number of subcarriers, and frequency domain channel values transformed into channel taps by a mathematical transformation.

↓

302. Obtain channel taps related to a number of subcarriers.

↓

303. Select a subset of the channel taps.

↓

304. Transports to the RU, the selected subset of the channel taps and information identifying the selected subset of channel taps. The selected subset of channel taps and information identifying the selected subset of channel taps assists the RU to perform beamforming for the communication between the UE and the base station.

(58) Field of Classification Search
USPC ................................................ 375/267, 130
See application file for complete search history.

(56) References Cited

U.S. PATENT DOCUMENTS

| 2018/0227037 | A1* | 8/2018 | Ahmed Ouameur | ........................ |
| | | | | H04B 7/0854 |
| 2019/0289497 | A1 | 9/2019 | Rajagopal | |
| 2019/0341987 | A1* | 11/2019 | Shim ................... H04L 25/0204 | |

OTHER PUBLICATIONS

An Liu et al., "Two-Timescale Hybrid Compression and Forward for Massive MIMO Aided C-RAN", Arxiv.org, Cornell University Library, 201 Olin Library Cornell University Ithaca, NY 14853, Mar. 12, 2019 (Mar. 12, 2019), XP081132323 abstract, Section II, Section IV.E.
Jing Li et al., "Hybrid beaming designs for 5G new radio with fronthaul compression and functional splits", IET Communications, the Institution of Engineering and Technology, GB, vol. 14, No. 20, Nov. 30, 2020 (Nov. 30, 2020), p. 3676-3685, XP006098112.
M. Garyantes, "xRAN Fronthaul Working Group Control, User and Synchronization Plane Specification", Apr. 4, 2018, pp. 1-62, XP055612006.
O-RAN Alliance e. V., "O-RAN Fronthaul Working Group Control, User and Synchronization Plane Specification" Jul. 16, 2020, p. 1-258.

* cited by examiner

100

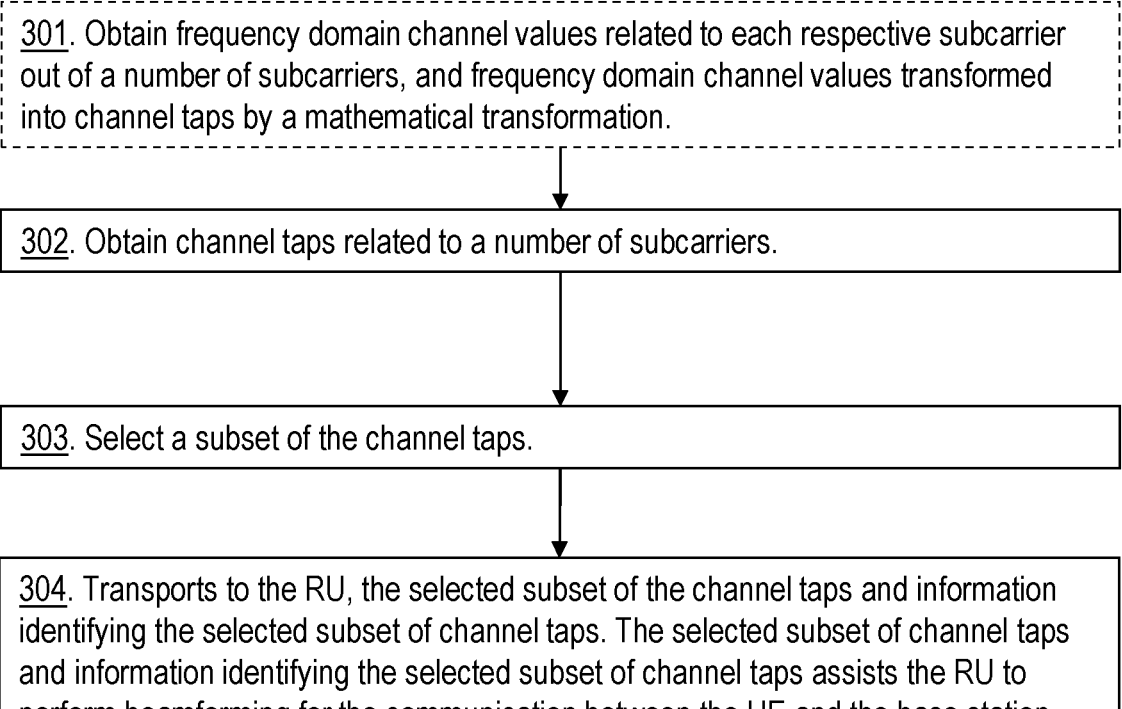

301. Obtain frequency domain channel values related to each respective subcarrier out of a number of subcarriers, and frequency domain channel values transformed into channel taps by a mathematical transformation.

302. Obtain channel taps related to a number of subcarriers.

303. Select a subset of the channel taps.

304. Transports to the RU, the selected subset of the channel taps and information identifying the selected subset of channel taps. The selected subset of channel taps and information identifying the selected subset of channel taps assists the RU to perform beamforming for the communication between the UE and the base station.

Fig. 3

<u>401</u>. Receive from the BBU associated with the base station, a subset of channel taps selected by the BBU and information identifying the selected subset of channel taps.

<u>402</u>. Reconstruct the channel taps in the tap domain based on the information identifying the selected subset of channel taps.

<u>403</u>. Transform by a mathematical transformation, at least some of the channel taps out of the set of channel taps, to obtain corresponding frequency domain channel values related to respective subcarriers out of a number of subcarriers.

<u>404</u>. Determines respective BFWs, according to the obtained frequency domain channel values, on the respective subcarriers out of the number of subcarriers.

<u>405</u>. Perform beamforming with the determined BFWs on the respective subcarriers out of the number of subcarriers for the communication between the UE and the base station.

Fig. 4

Computer
program 1080
Carrier
1090
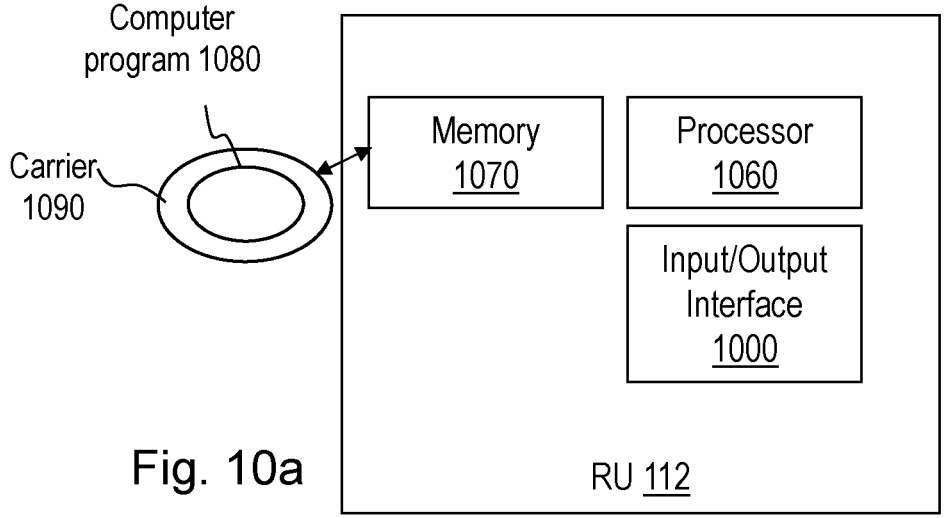
Fig. 10a
Fig. 10a
RU 112
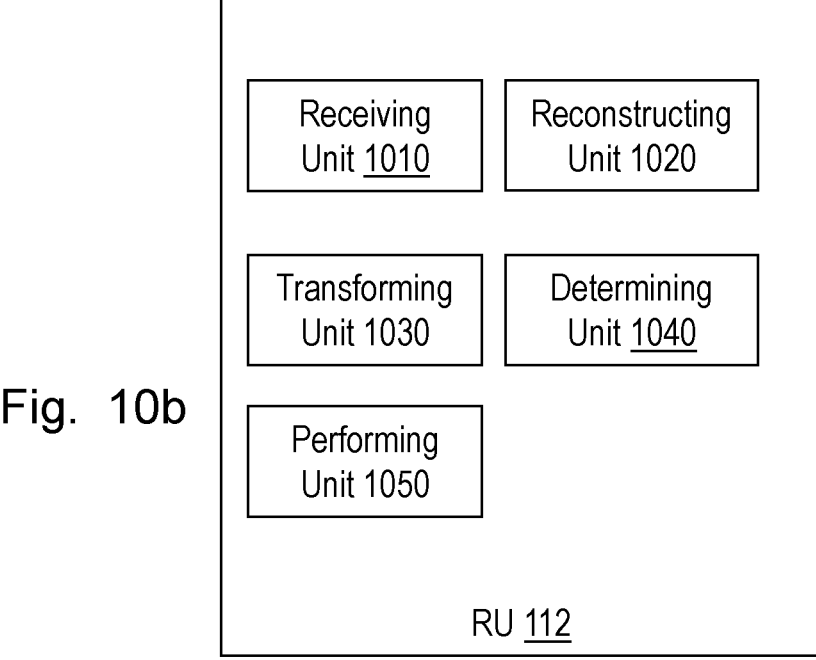
Fig. 10b
RU 112

BASEBAND UNIT, RADIO UNIT AND METHODS IN A WIRELESS COMMUNICATIONS NETWORKS

CROSS REFERENCE TO RELATED DATA

This application is a national-phase entry under 35 USC § 371 of International Application No. PCT/SE2021/050179, filed Mar. 2, 2021, titled "Baseband Unit, Radio Unit and Methods in a Wireless Communications Networks," the contents of which are hereby incorporated herein in its entirety.

TECHNICAL FIELD

Embodiments herein relate to a Baseband Unit (BBU) a Radio Unit (RU) and methods therein. In some aspects they relate to beamforming for a communication between a User Equipment (UE) and a base station in a wireless communications network using a multiple antenna system for communication.

BACKGROUND

In a typical wireless communication network, wireless devices, also known as wireless communication devices, mobile stations, stations (STA) and/or User Equipments (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands for 5G NR are being separated into two different frequency ranges, Frequency Range 1 (FR1) and Frequency Range 2 (FR2). FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHz. Bands in this millimeter wave range have shorter range but higher available bandwidth than bands in the FR1.

Multi-antenna techniques may significantly increase the data rates and reliability of a wireless communication system. For the wireless connection between a single user and the base station, the performance is in particular improved if both the transmitter and the receiver are equipped with multiple antennas, which results in a Multiple-Input Multiple-Output (MIMO) communication channel. This is usually referred to as SU-MIMO (single-user MIMO). In the scenario where MIMO techniques is used for the wireless connection between multiple users and the base station, MIMO enables the users to communicate with the base station simultaneously using the same time-frequency resources by spatially separating the users, which increases further the cell capacity. This is usually referred to as MU-MIMO (multi-user MIMO). Note that MU-MIMO can benefit when each UE only has one antenna. Such systems and/or related techniques are commonly referred to as MIMO.

Massive MIMO techniques have first been adopted to practice in LTE. In 5G, it becomes a key technology component, which will be deployed in a much larger scale than in LTE. It features with a large number of antennas used on the Base-station (BS) side, where the number of antennas is typically much larger than the number of user-layers. A user layer when used herein e.g. means an independent downlink or uplink data stream intended for one user. Note that one user or UE may have one or multiple user layers. For example, 64 antennas are serving 8 or 16 user-layers in FR1, and 256/512 antennas serving 2 or 4 layers in FR2. Massive MIMO is sometimes referred to as massive beamforming (especially for higher frequency band), which is able to form narrow beams focusing on different directions to counteract against an increased path loss at higher frequency bands. It also benefits MU-MIMO which allows for transmissions from and to multiple UEs simultaneously over separate spatial channels resolved by the massive MIMO technologies, while keeping high capacity for each UE. Therefore, it significantly increases the spectrum efficiency and cell capacity.

The great benefits of massive MIMO at the air-interface also introduce new challenges at the BS side. The legacy Common Public Radio Interface (CPRI)-type fronthaul sends time-domain IQ samples per antenna branch between a BBU and an RU, which are two parts of a BS in a main-remote setup. In the CPRI terminology, a BBU refers to as Radio Equipment Control (REC) and RU refers to as Radio Equipment (RE). With massive MIMO using many antennas, the required fronthaul data sent in CPRI would be increased dramatically, proportional to the number of antennas, which would require more fibers and optic modules, increasing transport costs significantly. To address, the fronthaul interface evolves from CPRI to eCPRI, a packet-based fronthaul interface. In eCPRI, other functional split options between an BBU and an RU are supported. Frequency samples are sent instead of time-domain samples in CPRI. Beamforming function is placed in the RU to reduce the number of fronthaul streams from the number of antennas to the number of user layers. As the number of user layers is much fewer than the number of antennas in massive MIMO, the fronthaul data are reduced significantly and thereby reduce the fronthaul costs.

Backhaul is the link between a base station and the core network and fronthaul is the link that connects a BBU to an RU. As the number of antennas scales up in massive MIMO systems, the required fronthaul capacity also increases proportionally if CPRI is used, which significantly drives up the fronthaul costs. To address this challenge, eCPRI supporting different Lower-Layer Split (LLS) options have been adopted. The basic idea of LLS is to move beamforming function from the BBU to the RU so that frequency samples or data of user layers are sent over the fronthaul interface.

An RU when used herein e.g. is a network node comprising of radio functions including some PHY functions. On the network side, it connects to a BBU through a fronthaul interface, e.g. eCPRI. On the other side, it connects to UEs wirelessly with its antennas. Basically, it transmits and receives the Radio Frequency (RF) signals to and from UEs through its antennas. It performs the conversion between RF signals and baseband signals, and transmits and receives the baseband signal to and from BBU through a fronthaul interface (e.g. eCPRI) according to a LLS option used.

Note that the RU is also referred to as RRU. In Open RAN (O-RAN), it is referred to as O-RU. In CPRI and eCPRI, it is referred to as RE.

A BBU when used herein e.g. is a network node performing baseband processing. It further connects to the core network with a backhaul interface.

Note that a BBU is also referred to as a digital unit or distributed unit (DU). In O-RAN, it is also referred to as O-Distributed Unit (O-DU).

SUMMARY

As a part of developing embodiments herein a problem was identified by the inventors and will first be discussed.

A control plane is the part of a network which carries information necessary to establish and control the network, while a user plane carries information regarding the network user traffic.

Although the LLS architecture such as e.g. O-RAN LLS, solves the problem of fronthaul limitation on data plane, a problem still exists in the control plane as the channel estimation is performed at BBU whereas beamforming is conducted at RU.

In one beamforming implementation specified by the current O-RAN LLS, channel information is obtained by channel estimation in the BBU, based on e.g. uplink Sounding Reference Signal (SRS) sent from the UE, received in the RU and sent in control-plane messages over the fronthaul interface to the BBU.

An object of embodiments herein is to improve the performance of a wireless communications network using beamforming.

According to an aspect of embodiments herein, the object is achieved by a method performed by a BBU for assisting a RU to perform beamforming for a communication between a UE and a base station in a wireless communications network using a multiple antenna system for communication. The BBU and the RU are associated with the base station. The BBU obtains channel taps related to a number of subcarriers. The BBU selects a subset of the channel taps. The BBU sent to the RU, the selected subset of the channel taps and information identifying the selected subset of channel taps. The selected subset of channel taps and information identifying the selected subset of channel taps assists the RU to perform beamforming for the communication between the UE and the base station.

According to another aspect of embodiments herein, the object is achieved by a method performed by an RU. The method is for performing beamforming for a communication between a UE and a base station in a wireless communications network using a multiple antenna system for communication. The RU is associated with the base station. The RU receives from a BBU, associated with the base station, a subset of channel taps selected by the BBU, and information identifying the selected subset of channel taps. The RU reconstructs the channel taps in the tap domain based on the information identifying the selected subset of channel taps. The RU transforms, by a mathematical transformation, at least some of the channel taps out of the set of channel taps, to obtain corresponding frequency domain channel values related to respective subcarriers out of a number of subcarriers. The RU determines respective Beamforming Weights (BFWs), according to the obtained frequency domain channel values, on the respective subcarriers out of the number of subcarriers. The RU then performs beamforming with the determined BFWs on the respective subcarriers out of the number of subcarriers for the communication between the UE and the base station.

According to an aspect of embodiments herein, the object is achieved by a BBU configured to assist an RU to perform beamforming for a communication between a UE and a base station in a wireless communications network adapted to use a multiple antenna system for communication. The BBU and the RU are adapted to be associated with the base station. The BBU is further configured to:

Obtain channel taps related to a number of subcarriers, select a subset of the channel taps, send to the RU, the selected subset of the channel taps and information identifying the selected subset of channel taps, which selected subset of channel taps and information identifying the selected subset of channel taps will assist the RU to perform beamforming for the communication between the UE and the base station.

According to another aspect of embodiments herein, the object is achieved by an RU configured to perform beamforming for a communication between a UE, and a base station in a wireless communications network adapted to use a multiple antenna system for communication. The RU is adapted to be associated with the base station. The RU is further configured to:

Receive from a BBU associated with the base station, a subset of channel taps selected by the BBU, and information identifying the selected subset of channel taps, reconstruct the channel taps in the tap domain based on the information identifying the selected subset of channel taps, transform by a mathematical transformation, at least some of the channel taps out of the set of channel taps, to obtain corresponding frequency domain channel values related to respective subcarriers out of a number of subcarriers, determine respective BFWs, according to the obtained frequency domain channel values, on the respective subcarriers out of the number of subcarriers, and perform beamforming with the determined BFWs on the respective subcarriers out of the number of subcarriers for the communication between the UE and the base station.

Since the BBU sends the selected subset of the channel taps and information identifying the selected subset of channel taps to the RU, which means over the fronthaul, the amount of channel data will be significantly reduced resulting in less bit rate required for fronthaul, while the performance is kept to the same level as without channel data reduction. In other words, when the same amount channel data is kept in channel taps as in the frequency-domain channel values, an improved performance of the wireless communications network when using beamforming.

BRIEF DESCRIPTION OF THE DRAWINGS

Examples of embodiments herein are described in more detail with reference to attached drawings in which:

FIG. 3 is a flowchart depicting embodiments of a method in a BBU.

FIG. 4 is a flowchart depicting embodiments of a method in an RU.

FIG. 10*a-b* are schematic block diagrams illustrating embodiments of an RU.

DETAILED DESCRIPTION

Figure 1:
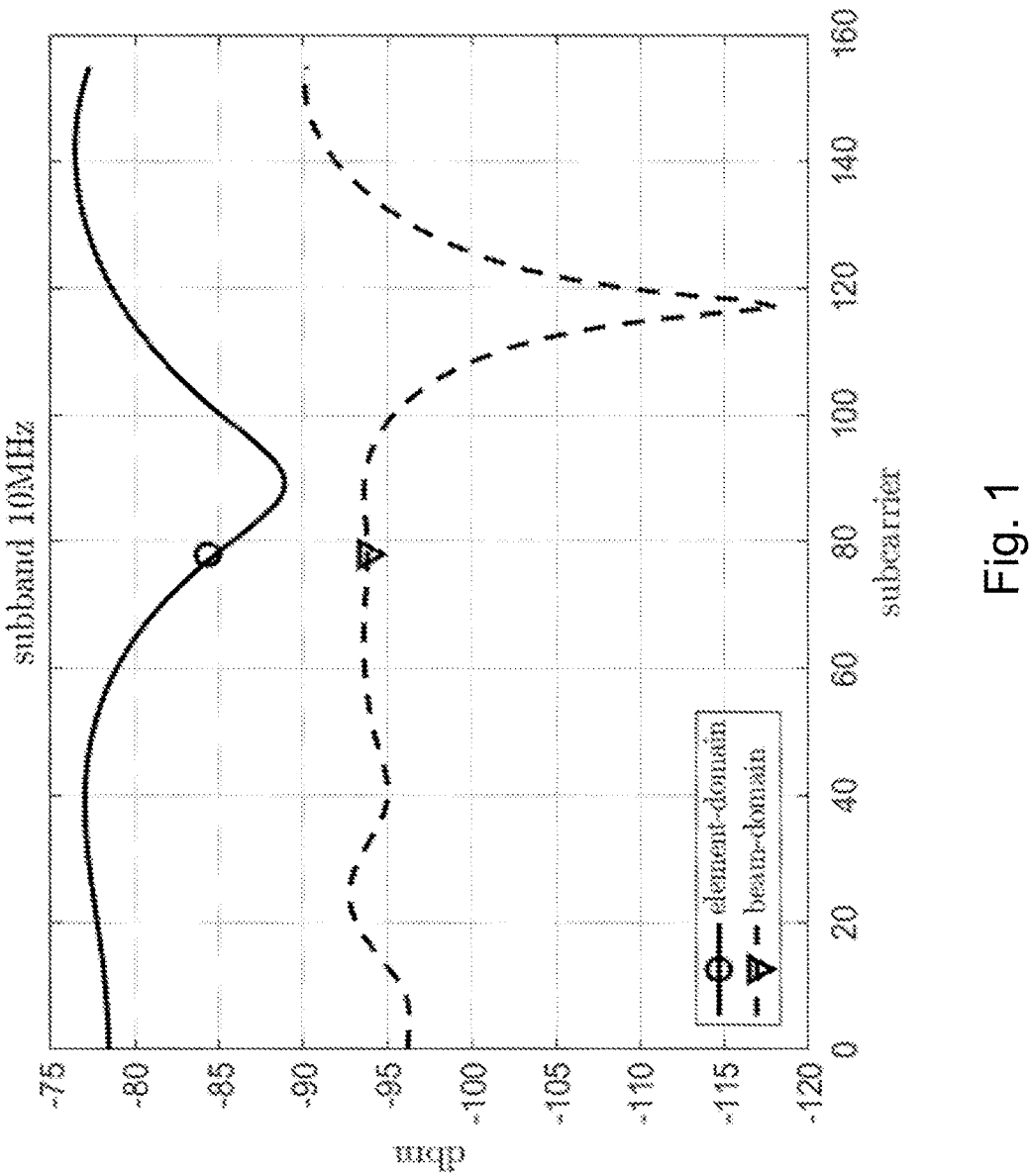
FIG. 1 is a diagram illustrating an example embodiment herein.

As mentioned above, as a part of developing embodiments herein a problem was identified by the inventors which now will be further discussed.

As also mentioned above, the idea of LLS is to move beamforming function from the BBU to the RU so that frequency samples or data of user layers are sent over the fronthaul interface. The interface between the BBU and the RU is the fronthaul interface. The interface between the BBU and the CN is the backhaul interface.

In one O-RAN LLS implementation supporting channel-information based beamforming according to prior art, UE-specific channel information is sent from BBU to RU over the fronthaul interface using a Section Type 6 messages of O-RAN Fronthaul Working Group, Control, User and Synchronization Plane Specification, O-RAN.WG4.CUS.0-v04.00 and the newer releases (O-RAN specification). At RU, the received channel information is firstly stored in memory, with respect to a number of UEs. This channel information is UE-specific, may be for the whole channel bandwidth or Bandwidth Part (BWP), or corresponding to the channel sounding bandwidth of each UE scheduled by the base station. Channel sounding bandwidth here refers to the bandwidth used by the uplink Sounding Reference Signal (SRS). With the channel information, the RU can calculate Beamforming Weights (BFWs) if it knows which UEs are to be beamformed and how these UEs are scheduled on the frequency-time resource grid. BFWs when used herein e.g. means a set of complex weights, each of which are multiplied with the signal of one user-layer at a subcarrier or a group of subcarriers. The weighted signals of different user layers towards the same antenna or transmit beam are combined linearly. As a result, different user-layer signals are beamformed to different directions. To inform the RU such information how UEs are scheduled, for each Transmission Time Interval (TTI), the BBU will send the scheduling information of next TTI to the RU, e.g. regarding the scheduled UE Identities (IDs) and frequency-time resources such as e.g. symbol, Physical Resource Blocks (PRB), or Resource Element (RE). In O-RAN, this is done using Section Type "5" the O-RAN specification. Additionally, in O-RAN, a regularization factor is also sent for Minimum Mean Squared Error (MMSE)-based beamforming from BBU to RU using Section Extension "8" together with Section Type "5" of the O-RAN specification. After receiving the scheduling information, the RU will extract the channel information corresponding to the scheduled UE IDs from the memory and then calculate BFWs based on the extracted channel information. For DL, the BFWs are used to perform beamforming of the user-layer symbols or REs of the scheduled UEs. For UL, the BFWs are used to perform beamforming of the received frequency-domain signals or REs from different antennas and/or beams. However, the problem is that the amount of channel data is still proportional to the number of antennas. This would result in a large amount channel information to be sent via the fronthaul interface, especially when the number of UEs is large. This could significantly increase the fronthaul load. For point-to-point fronthaul topology, the available fronthaul capacity would be a constraint limiting the number of UEs to be beamformed. For switched fronthaul network topology, this may significantly increase the required capacity of the switched or packet network, reducing the potential statistical multiplexing gain, otherwise limiting the number of UEs to be beamformed. In addition, in this split, the RU memory is required to be large when there are many UEs to be beamformed.

In another possible LLS implementation according to prior art, for every TTI, the BBU sends the channel information of the scheduled UEs to the RU. Then the RU calculates the BFWs using the received channel information and then uses the calculated BFWs to perform beamforming of the user-layer signals of the scheduled UEs. In this split, the channel information needs to be sent in a short-time window such that the RU would have enough time to calculate the BFWs before the due time for doing beamforming. This results in high burst fronthaul traffic for sending the channel information, which significantly increases the required peak rate of fronthaul and therefore increases the fronthaul costs.

In both cases, it is desirable to compress the channel information. One prior art approach compresses the channel data in the frequency domain. Basically, one or multiple resource blocks (RBs) are grouped as a Subcarrier Group (SCG). For each SCG, only the channel information corresponding to one subcarrier, usually the center subcarrier, in the SCG is sent, instead of sending the channel information per subcarrier. For example, for 1 SCG=1 RB where there are 12 subcarriers per RB, the channel information is compressed 12 times before sent to the RU. On the RU, the beamforming is done on SCG level, one corresponding set of BFWs per SCG calculated based on the channel information per SCG. Then, the same set of calculated BFWs are used for all subcarriers in each SCG. However, the compression is achieved at the cost of beamforming performance degradation, especially when the channel variation in frequency domain is high among the subcarriers in SCG.

Reference Method According to Prior Art

Consider the scenario with K user-layers in a desired cell and the base-station 110 is composed of N antenna elements. In 5G, it typically has N>>K, i.e. N is much larger than K. A user-layer when used herein may mean an independent data stream intended to a user. A desired cell when used herein may mean the cell which connects to the UEs of the K user-layers. These UEs are served by the desired cell. Here, MU-MIMO is applied, where K user-layers are scheduled using the same time-frequency resources, i.e., on the same REs.

The amount of DL user-plane data scales with the number of layers (K) whereas the channel data on one subcarrier composed by K×N elements scale both with the number of layers (K) and the number of antennas (N) on each subcarrier. User-plane data when used herein e.g. means the frequency-domain user-layer data sent over fronthaul. Layers when used herein e.g. means user-layers, user-layer signals or user-layer data in frequency domain.

According to a prior art solution, the amount of channel data to be sent is reduced by only sending channel information on one subcarrier in one or multiple RBs, referred to as one subcarrier group, SCG. BFWs calculated based on this channel information will be shared by other subcarriers in the SCG. This method is referred to as reference method hereinafter and will be used later on to compare with embodiments herein.

According to a further prior art solution, a higher reduction on the required fronthaul capacity may be achieved by using a larger SCG size, but the beamforming performance will be degraded since more channel data is lost by performing such down-sampling in frequency. The wording beamforming performance when used herein may mean signal quality in downlink (DL) at the UE side after the beamforming has been performed at the base station side, measured by, for example, post-processing signal-to-interference-and-noise-power ratio (SINR) at a UE, resulted user throughput, bit rate, etc.

FIG. 1 depicts examples of channel element power along subcarriers according to prior art. It depicts how a wireless channel frequency response may look like. This is an example of a wireless channel frequency response. FIG. 1 exemplifies the power in dBm of channel elements of one channel path between one antenna (for element domain) or one beam (for beam domain) of a base-station and one antenna of a UE along sub-carriers according to prior art dBm, also referred to as decibel-milliwatts (dBmW), is a unit of level used to indicate that a power level is expressed in decibels (dB) with reference to one milliwatt (mW). The circle-marked line shows results of element-domain channel, whereas the triangle-marked line shows results of beam-domain channel. It is observed that having an even-spaced down-sampling in frequency may work well when the channel does not vary so much in the neighborhood, but leads to the loss of informative channel data when the channel varies quickly in frequency and impacts beamforming performance at the RU 112.

The object of embodiments herein is to improve performance of a wireless communications network using beamforming.

The wording tap-domain when used herein e.g. means frequency-domain channel coefficients are transferred to channel taps by a mathematical transformation, such as DCT, DFT etc. Each channel tap corresponds to a multi-path component of the wireless channel, resolved by the system, e.g. sample rate and transformation size etc. Each channel tap is a complex value, representing the amplitude and phase of the resolved multi-path component of the wireless channel. The channel taps are related to the impulse response of the wireless channel.

The wording channel value, also referred to as channel data, when used herein e.g. means one or a set of complex values representing the amplitude and phase of the channel coefficients in frequency domain. The channel values are related to the frequency response of the wireless channel. The wording channel information, when used herein, e.g., means the information about channel properties carried by the channel values.

A beam when used herein e.g. means a directional beam formed by multiplying a signal with different weights, in frequency-domain, at multiple antennas such that the energy of the signal is concentrated to a certain direction.

Beamforming when used herein e.g. means a technique which multiplying a signal with different weights (in frequency-domain) at multiple antennas, which would cause the signal energy sent to space according to a wanted beam pattern to form a directional beam to concentrate to certain direction or form nulling to certain direction, or the combination of two.

Examples of embodiments herein provide tap-domain compression for channel data in fronthaul.

In some examples, the method according to embodiments herein compress the channel information by transforming the channel data in the tap-domain, also referred to as transforming frequency-domain channel data into channel taps. Only the transformed channel data on selected taps are sent from the BBU to the RU. At the RU, the tap-domain channel data is reconstructed based on the selected channel taps received, to obtain corresponding frequency domain channel values, also referred to as channel data. The obtained frequency domain channel values are then used as a basis when calculating BFWs for beamforming.

The embodiments provided herein e.g. have the following advantage:

In today's O-RAN specification, the channel data is sent per PRB. By using embodiments herein, the channel data will be significantly reduced while the performance is kept. This is since most of the channel energy may be concentrated on a limited number of channel taps, in which most of the channel information is kept by only sending the selected high-power channel taps.

Figure 2:
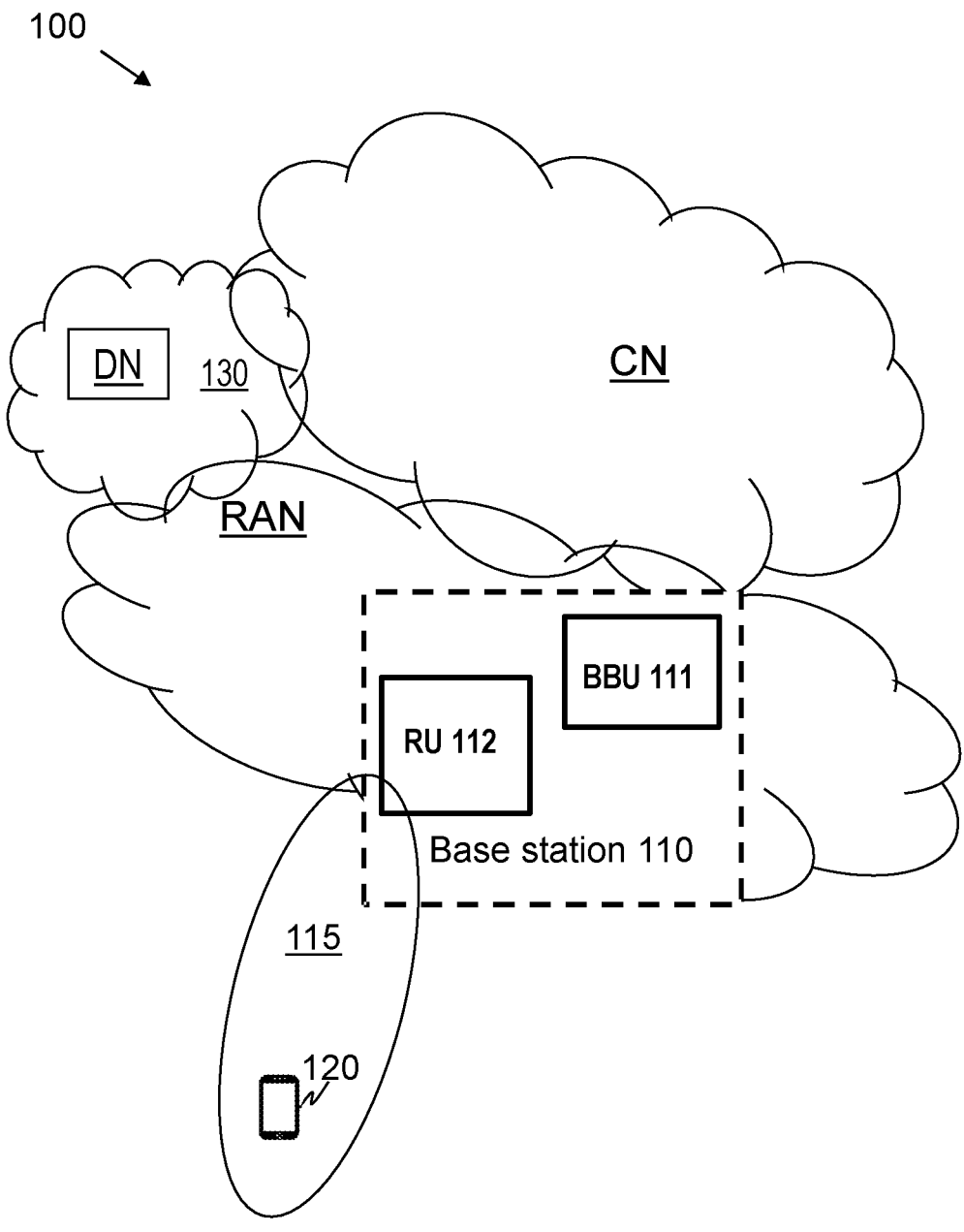
FIG. 2 is a schematic block diagram illustrating embodiments of a wireless communications network.

FIG. 2 is a schematic overview depicting a wireless communications network wherein embodiments herein may be implemented. The wireless communications network 100 comprises one or more RANs, and one or more CNs. The wireless communications network 100, the RAN and the CN may use a number of different technologies, such as Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UM B), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g. a base station 110. The base station 110 comprises a BBU 111 and a RU 112, also referred to as the base station 110 is associated to the BBU 111 and the RU 112. The base station 110 provide radio coverage in a number of cells which may also be referred to as a sector or a group of sectors, such as a cell 115 provided by the base station 110.

The base station 110, may be any of a radio network node, NG-RAN node, a transmission and reception point e.g. a base station, a TRP, a radio access network node, a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a UE such as UE 120, within a service area served by the base station 110, depending e.g. on the first radio access technology and terminology used. The base station 110 may be referred to as a serving radio network node and communicates with the UE 120 with Downlink (DL) transmissions to the UE 120 and Uplink (UL) transmissions from the UE 120.

One or more UEs operate in the wireless communications network 100, such as e.g. the UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more CNs. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The UE 120 is in some example scenarios served by the base station 110 in the cell 115.

Methods herein may be performed by the BBU 111 and the RU 112. As an alternative, a Distributed Node (DN) and functionality, e.g. comprised in a cloud 130 as shown in FIG. 2, may be used for performing or partly performing the methods herein.

The above described problem is addressed in a number of embodiments, some of which may be seen as alternatives, while some may be used in combination.

FIG. 3 shows example embodiments of the method as seen in a view of the BBU 111, and FIG. 4 shows example embodiments of the method as seen in a view of the RU 112.

Figure 5:
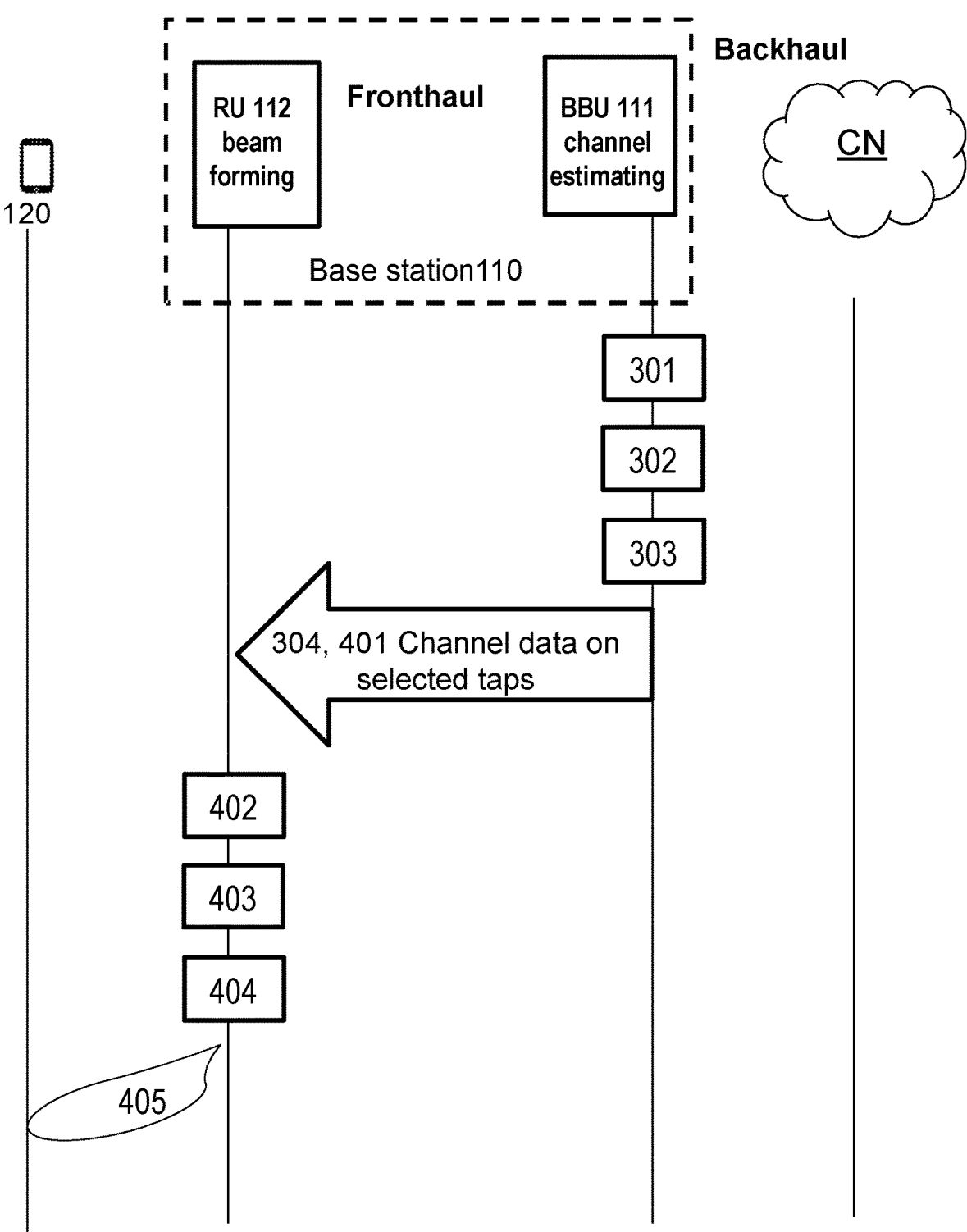
FIG. 5 is a sequence diagram depicting embodiments herein.

FIG. 5 shows a sequence diagram of example embodiments of a method performed by the BBU 111 and the RU 112. The BBU 111 assists the RU 112 to perform beamforming, and the RU 112 performs the beamforming assisted by the BBU 111. The beamforming is for a communication between the UE 120 and the base station 110 in the wireless communications network 100.

The text described below in relation to FIG. 3 shall preferably be read together with both FIG. 3 and FIG. 5, and the text described below in relation to FIG. 4 shall preferably be read together with both FIG. 4 and FIG. 5.

FIG. 3 shows example embodiments of a method performed by the BBU 111 for assisting the RU 112 to perform beamforming. The beamforming is for a communication between the UE 120 and the base station 110 in the wireless communications network 100. The wireless communications network 100, e.g. the RU 112 and the UE 120, uses a multiple antenna system for communication. The multiple antenna system may e.g. be MIMO, Single-Input Multiple-Output (SIMO) and/or Multiple-Input Single-Output (MISO).

The BBU 111 and the RU 112 are associated with the base station 110. This means that the base station 110 comprises two parts, i.e. the BBU 111 and the RU 112. The method comprises the following actions, which actions may be taken in any suitable order. Optional actions are referred to as dashed boxes in FIG. 3.

Referring to FIG. 3 and FIG. 5:

Action 301

In some embodiments, channel estimation is already done by the BBU 111 in the tap-domain and the tap-domain channel data will be available for the BBU 111 without additional mathematical transformation into tap-domain.

In some embodiments, frequency domain channel values resulted from the channel estimation may be based on uplink signals, e.g. Sounding Reference Signal (SRS) and/or Demodulation Reference Signal (DMRS), sent by the UE 120 to the BBU 111. In these embodiments, the BBU 111 obtains frequency domain channel values related to each respective subcarrier out of a number of subcarriers.

In some embodiments the number of subcarriers may comprise subcarriers corresponding for the whole bandwidth used for the communication with the UE 120. This may be performed in cases such as for SRS.

In some alternative embodiments the number of subcarriers comprises subcarriers corresponding to the bandwidth for the UE 120 scheduled for the next TTI in the communication. This may be used in cases such as e.g. SRS, and Demodulation Reference Signal (DMRS).

The frequency-domain channel values may be obtained based on any one or more out of.

channel estimation in any one out of: an element-domain or a beam-domain, and reference signals transmitted by the UE 120. The channel estimation in the element-domain may be performed by the BBU 111 using reference signals in antenna element domain. The channel estimation in the beam-domain may be performed by the BBU 111 using reference signals in beam domain, e.g. by transforming the frequency-domain channel values in antenna domain to the frequency-domain channel values in beam domain by performing a DFT over the channel values of multiple antennas at a subcarrier. The reference signal may e.g. be SRS, DMRS, etc.

Action 302

The BBU 111 obtains channel taps related to a number of subcarriers. E.g. the BBU obtains a set of channel taps, where the set of channel taps is related to a number of subcarriers.

In some embodiments, the BBU 111 obtains the channel taps by transforming the obtained frequency domain channel values into the channel taps by a mathematical transformation. The mathematical transformation may e.g. be Discrete Fourier Transform (DFT), or Discrete Cosine Transform (DCT).

The relation between the channel taps and the number of subcarriers is many to many. Each channel tap has contributions from all subcarriers used in a transformation. The channel values in frequency domain correspond to, also referred to as related to, the channel frequency response, while the channel taps correspond to, also referred to as related to, the channel impulse response. Basically, each channel tap is a linear combination of the channel values of all subcarriers, weighted differently based on the type of transformation used.

In some embodiments as mentioned above, the channel estimation is already done by the BBU 111 in tap-domain inside the channel estimation process, and the tap-domain channel data is available for the BBU 111 without the need of performing additional mathematical transformation to tap-domain.

Action 303

The BBU 111 selects a subset of the channel taps. This is performed to reduce the required fronthaul capacity for sending channel information from the BBU 111 to the RU 112.

The selection may be based on different values. In some embodiments the subset of the channel taps is selected according to, anyone or more out of:

Based on values of the channel taps.

Based on a power and/or amplitude values of the channel taps.

Based on a threshold value of power and/or amplitude of the channel taps.

The selection may be performed in different ways. The selection of the subset of the channel taps may e.g. be performed by anyone out of:

Selecting the subset of the channel taps firstly in a beam-domain, then in a tap-domain, Selecting the subset of the channel taps firstly in a tap-domain, then in a beam-domain, or Selecting the subset of the channel taps with respect to a joint beam-tap-domain.

Action 304

The BBU 111 sends to the RU 112, the selected subset of the channel taps and information identifying the selected subset of channel taps. The selected subset of channel taps and information identifying the selected subset of channel taps assists the RU 112 to perform beamforming for the communication between the UE 120 and the base station 110.

This way of sending the selected subset of the channel taps and information identifying the selected subset of channel taps provides to the RU 112, essential channel information for BFW calculation while reducing the required fronthaul capacity for sending such information.

The handling of selected subset of the channel taps and information identifying the selected subset of channel taps, by the RU 112, will be described below together with FIG. 2 and FIG. 4.

FIG. 4 shows example embodiments of a method performed by the RU 112. The method is for performing beamforming for a communication between the UE 120 and the base station 110 in the wireless communications network 100 using a multiple-antenna system for communication.

The RU 112 is associated with the base station 110. The method comprises the following actions, which actions may be taken in any suitable order. Optional actions are referred to as dashed boxes in FIG. 4.

Referring to FIG. 4 and FIG. 5:

Action 401

The RU 112 receives from the BBU 111, a subset of channel taps selected by the BBU 111, and information identifying the selected subset of channel taps. The BBU 111 is associated with the base station 110.

By means of the received a subset of channel taps selected by the BBU 111, and information identifying the selected subset of channel taps, the RU 112 may now reconstruct the channel taps based on the received information identifying the selected subset of channel taps. Zeros may be refilled at the positions of the unselected channel taps. At least some of the reconstructed channel taps are transformed to obtain corresponding frequency domain channel values related to respective subcarriers, which will be used for determines respective BFWs. This will be described below.

Action 402

The RU 112 reconstructs the channel taps in the tap domain based on the information identifying the selected subset of channel taps. This may be performed in different ways.

In some embodiments the RU 112 reconstructs the channel taps in the tap domain, by filling zeros at the positions of the unselected channel taps according to the received information identifying the selected subset of channel taps The received channel data, such as the selected subset, is always non-zero.

There are also some alternative embodiments. E.g. If the subset of channel taps is very small, it is possible to calculate the transform, below in Action 403, directly for those channel taps only, without filling any zeros. A small subset of channel taps may e.g. be a few channel taps, e.g. less than 10. This may mean that for too few channel taps it may be more efficient to calculate transformation by matrix multiplication, instead of doing a full transformation with zero-filled channel taps, due to the property of sparse matrix multiplication. A sparse matrix multiplication when used herein may mean the matrices or vectors involved in the matrix multiplication operation having more zero elements than non-zero elements.

Action 403

The RU 112 transforms, at least some of the channel taps out of the set of channel taps, i.e. out of the reconstructed set of channel taps. This is to obtain corresponding frequency domain channel values related to respective subcarriers out of a number of subcarriers. This is performed by a mathematical transformation, such as e.g. DFT or DCT.

Action 404

When having obtained the frequency domain channel values related to respective subcarriers out of a number of subcarriers, the RU 112 determines respective BFWs, according to the obtained frequency domain channel values, on the respective subcarriers out of the number of subcarriers.

In some embodiments the determining of the respective BFWs according to the obtained frequency domain channel values, on the respective subcarriers out of the number of subcarriers comprises:

Calculating BFWs according to the obtained frequency domain channel values for at least part of the respective subcarriers out of the number of subcarriers, and if not BFWs on all subcarriers of the number of subcarriers has been calculated, obtaining BFWs on the remaining sub-carriers based on the calculated BFWs.

In some embodiments the BFWs on the remaining sub-carriers are obtained by anyone or more out of: Repeating the calculated BFWs for neighboring sub-carriers of the remaining sub-carriers, and/or interpolating the calculated BFWs for the remaining sub-carriers. This will be described more in detail below.

Action 405

The RU 112 then performs beamforming with the determined BFWs on the respective subcarriers out of the number of subcarriers for the communication between the UE 120 and the base station 110.

In this way, the required fronthaul capacity for sending channel information from the BBU 111 to the RU 112 is significantly reduced while the beamforming performance is maintained.

The above embodiments will now be further explained and exemplified below. The embodiments below may be combined with any suitable embodiment above.

In the examples below, the frequency domain channel values are referred to as channel data and these wordings may be used interchangeably.

Channel Representation in Tap-Domain

Some embodiments relate to frequency domain channel value based beamforming such as e.g. channel-information based beamforming. When these embodiments relate to the LLS architecture, channel estimation may be performed at the BBU 111 based on UL reference signals, e.g. SRS transmitted by the UE (120). The frequency domain channel values are transformed to channel taps.

The selected channel taps are then sent from the BBU 111 to the RU 112. At the RU 112, BFWs are calculated using the obtained frequency domain channel values corresponding to the received channel taps, and downlink (DL) or uplink (UL) beamforming is conducted for a received data stream in the communication between the UE 120 and the base station 110.

According to embodiments herein, channel data is explored in tap-domain instead of frequency-domain by taking advantage of good energy compacting feature of certain mathematical transformation such as DFT or DCT, so that the channel energy is concentrated on a limited number of taps after transformation.

Figure 6:
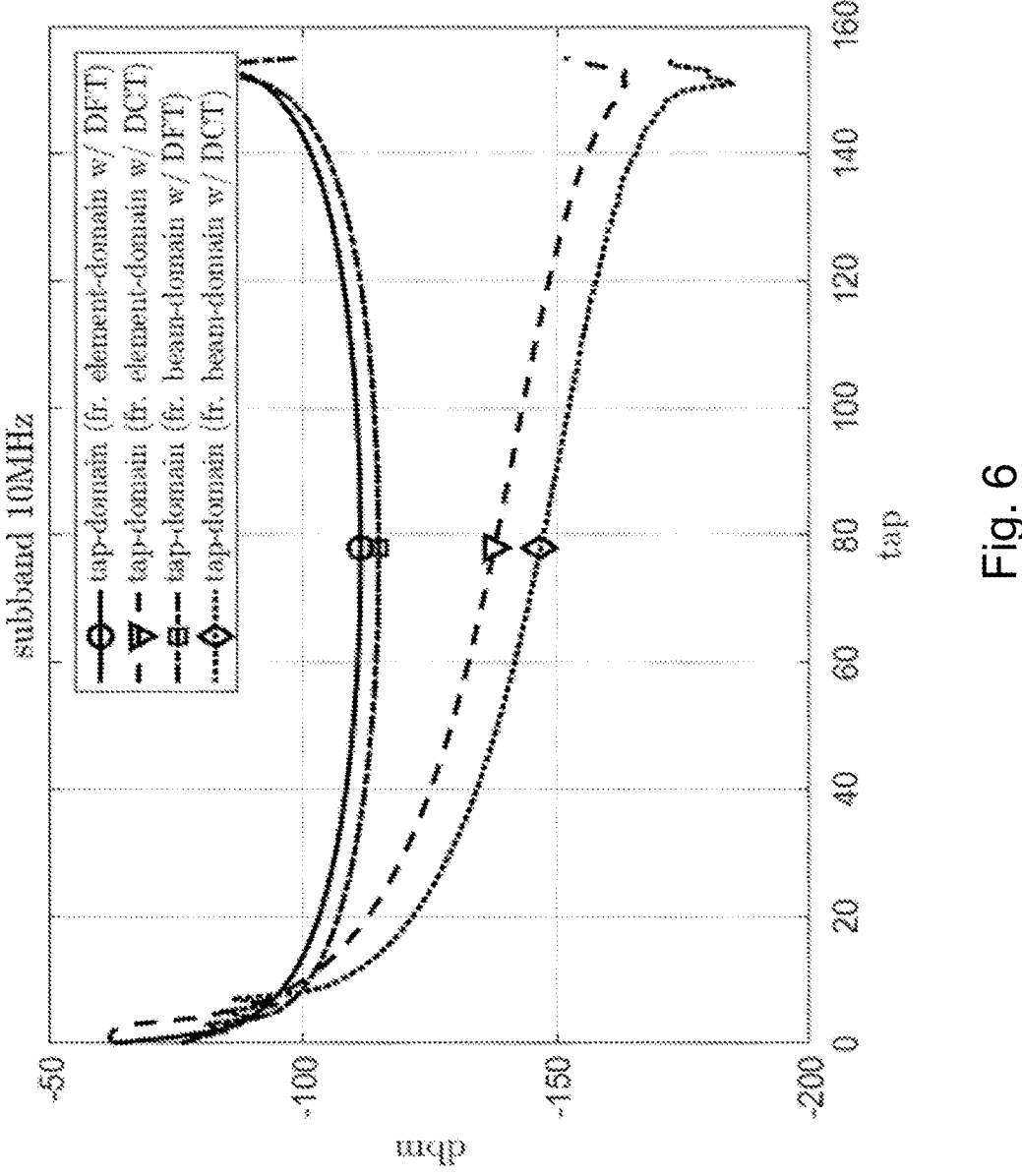
FIG. 6 is a diagram illustrating an example embodiment herein.

As mentioned above, the channel taps may be obtained by transforming the frequency domain channel values into the channel taps by a mathematical transformation. It is observed that the mathematical transformation such as some Fourier transforms, for example, DFT, or DCT, has good energy compacting feature. After transformation, channel energy may be concentrated in a limited number of taps. FIG. 6: depicts examples of channel element power along taps according to embodiments herein. FIG. exemplifies the power of channel elements of the same channel path as exemplifies the power of channel elements in FIG. 1 depicting prior art, but along taps after conducting certain Fourier transform according to some embodiments herein. The circle-marked line shows results of tap-domain channel transformed by DFT from channel data in element-domain. The triangle-marked line shows results of tap-domain channel transformed by DCT from channel data in element-domain. The square-marked line shows results of tap-domain channel transformed by DFT from channel data in beam-domain. The diamond-marked line shows results of tap-domain channel transformed by DCT from channel data in beam-domain. It is observed in FIG. 6 that the channel energy concentrates on some channel taps in all four cases, i.e. the beginning and tail parts of the circle and square marked curves and the beginning part of the triangle and diamond marked curve. In this example, DCT compacts the channel energy better than DFT, and transform from beam-domain compacts the channel energy better than that from element-domain.

Therefore, according to an example embodiment herein, the BBU 111 performs channel data reduction by selecting a subset of the channel taps, preferably the strongest ones. Then BBU 111 sends the reduced tap-domain channel data to RU 112. In this way, more channel energy, comprising more frequency-domain channel information, may be maintained comparing to the frequency-domain compression with the same compression ratio. The reduced channel data will be utilized by the RU 112 for beamforming.

Below, a further example of embodiments herein is described.

Consider a scenario with K user-layers in a desired cell communicating with the base station 110 being equipped with N antennas. The channel data such as the frequency domain channel values may either be in UL or DL.

Methods at the BBU 111

Perform channel estimation in element-domain or beam-domain and obtain the channel data such as the frequency domain channel values on some or all subcarriers within a certain bandwidth. This relates to Action 301 described above.

For a first LLS option, the number of subcarriers may be large, e.g. for the whole carrier bandwidth. In this option, the channel data is sent before the scheduling information is available.

For the second LLS option, the number of subcarriers corresponds to the bandwidth for the UEs scheduled for the next TTI.

Transform the channel data such as the frequency domain channel values from frequency-domain to tap-domain by a mathematical transformation (for example, DFT or DCT). This relates to Action 302 described above.

The transformation may be performed regarding every L subcarriers of each of the channel path between antenna or beam n, for n=1, . . . , N and user-layer k, for k=1, . . . , K. Note that if the transform size is large enough to cover all available subcarriers, the transformation may be performed regarding all available subcarriers.

The transformation may use some or all subcarriers where the channel estimation has been conducted.

In some implementation, channel estimation is already done in tap-domain. In this case, the first 3 steps are included in the channel estimation process and tap-domain channel data will be available.

Select M taps to be sent from the BBU 111 to the RU 112. Information of tap selection is noted, for example, with bitmask or tap indices. This relates to Action described above.

The M selected taps can be entries with the largest power/amplitude.

Selection can be done using a threshold by selecting the taps (up to a specified maximum number of taps) which are higher amplitude (normalized) than a threshold.

The value of M can be different for different channel paths between antenna or beam n, for n=1, . . . , N and user-layer k, for k=1, . . . , K.

In one embodiment, the selection is firstly done in beam-domain, then in tap-domain.

In another embodiment, the selection is firstly done in tap-domain, then in beam-domain.

In another embodiment, the selection is with respect to a joint beam-tap-domain.

Send the information of selected tap-domain channel data together with the information of tap selection to RU. This relates to Action 304 described above.

Methods at the RU 112

Receive from the BBU 111, the information of selected tap-domain channel data together with the information of tap selection, such as e.g. the subset of channel taps selected by the BBU 111, and information identifying the selected subset of channel taps. This relates to Action 401 described above.

Reconstruct channel data in tap-domain using the received information of channel data and information of tap selection; This relates to Action 402 described above.

The reconstruction may be done by filling zeros at the positions of the unselected channel taps according to the bitmask or tap indices.

Transform at least some of the channel taps out of the set of channel taps, e.g. the channel data back to element-domain or beam-domain in frequency with the corresponding inverse transformation (for example, IDFT or IDCT) and obtain channel data on some or all subcarriers. If beam-domain channel is obtained, further transform it back to element-domain. This relates to Action 403 described above.

The inverse transformation may be performed such that to obtain corresponding frequency domain channel values related to respective subcarriers out of a number of subcarriers such s e.g. channel data is obtained only on subcarriers that BFWs calculation will be performed in the next step. This reduces the processing complexity.

Calculate BFWs according to the obtained channel data after inverse transformation; This relates to Action 404 described above.

If not BFWs on all sub-carriers has been calculated, determine BFWs on the remaining sub-carriers based on the calculated BFWs. This also relates to Action described above.

BFWs on the remaining sub-carriers may be obtained by repeating the calculated BFWs on neighboring sub-carriers.

BFWs on the remaining sub-carriers may be obtained by interpolating the calculated BFWs.

Two methods above may also be used jointly by partial interpolation and then repeat on neighboring subcarriers.

Perform beamforming with the determined BFWs on each subcarrier. This relates to Action 405 described above.

For DL, the BFWs are used to perform beamforming to the user-layer symbols of the scheduled UEs such as e.g. the UE 120.

For UL, the BFWs are used to perform beamforming to the received signals from different antennas/beams.

Simulation Results

To illustrate advantages of embodiments herein, simulations have been performed as follows:

Channel realization in element-domain of 100 MHz with 60 kHz SCS, N=64 antennas and K=8 user-layers is used.

Number of PRBs is 136, where each PRB has 12 subcarriers.

Element-domain channel data at each subcarrier of the whole channel bandwidth are firstly transformed into beam-domain channel data using DFT.

Beamforming scheme: zero-forcing beamforming in DL using beam-domain channel data.

Both power per user-layer and power per antenna element are normalized when performing beamforming.

For tap-domain compression as described above, it is implemented as follows:

The beam-domain channel data of all subcarriers of each beam are transformed into tap-domain using DCT.

Figure 7:
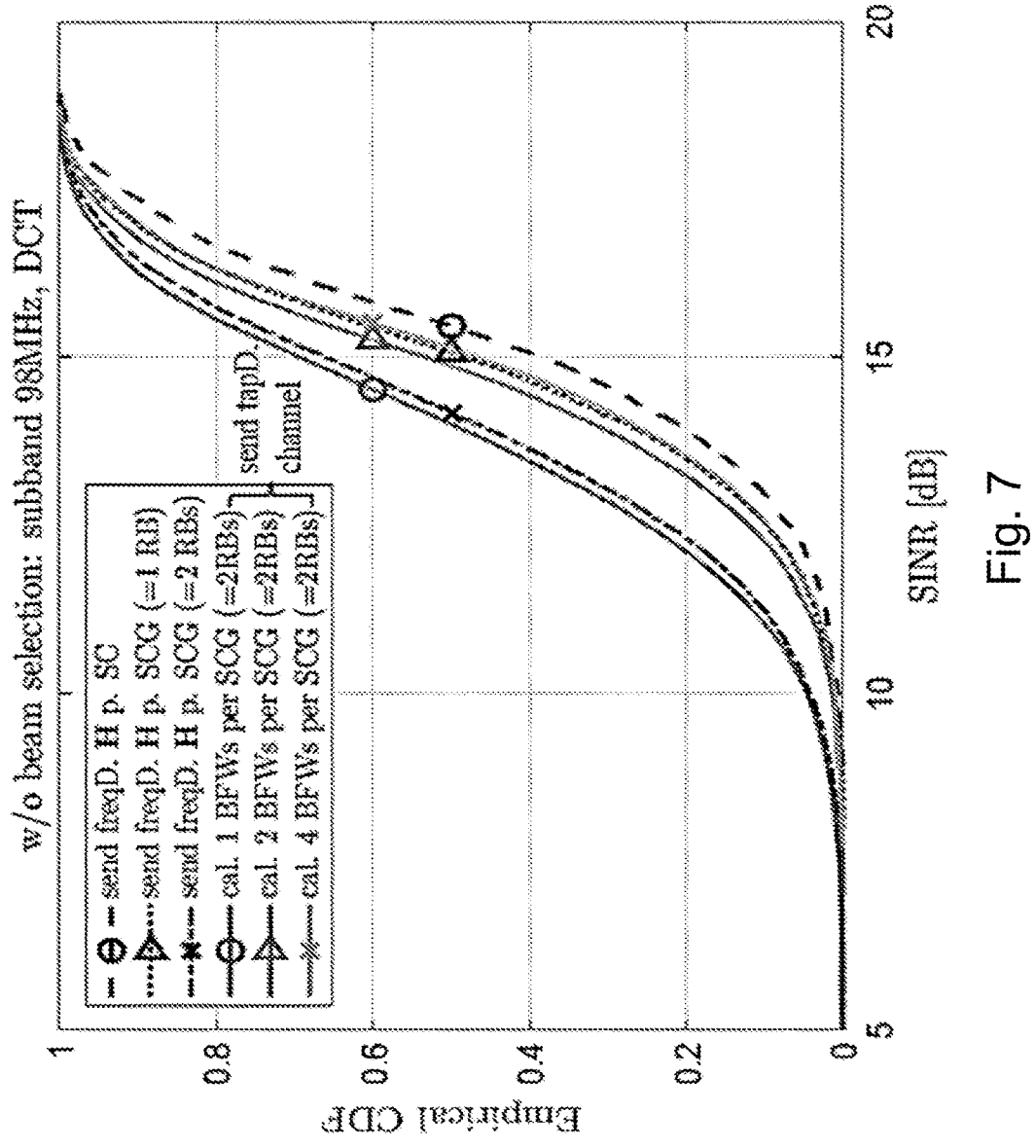
FIG. 7 is a diagram illustrating an example embodiment herein.
Figure 8:
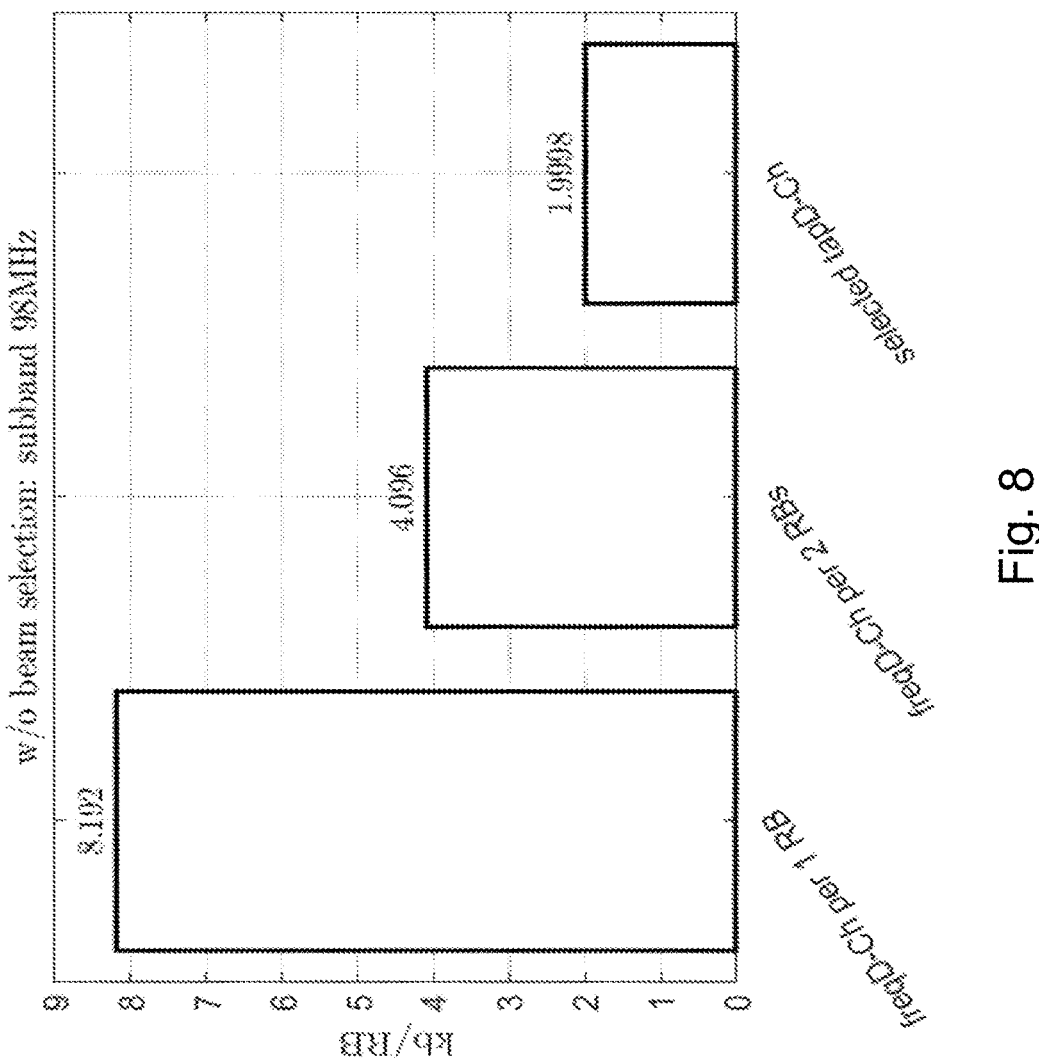
FIG. 8 is a diagram illustrating an example embodiment herein.

The simulation results are shown in FIG. 7 and FIG. 8.

FIG. 7: depicts SI NR comparison without beam selection at DU with 98 MHz sub-band for transforming to tap-domain and FIG. 8: depicts comparison of required fronthaul capacity.

FIG. 7 compares the SI NR performance between the reference method of sending channel data in frequency-domain and the method of the invention of sending channel data in tap-domain. And FIG. 8 shows the required fronthaul capacity for sending channel data associated with each of the method.

In this simulation example, only 2% of the taps are selected to be sent in an example of the method according to embodiments herein. As a result, the channel data is compressed by 2 times comparing to the reference case when frequency-domain channel (freqD-Ch) data on one subcarrier per 2 PRBs is sent; and it is compressed by 4 times comparing to the reference method when frequency-domain channel data on one subcarrier per 1 RB is sent. Performance-wise, the method according to embodiments herein, have better performance with BFWs on 2 subcarriers calculated per SCG than the reference method with the same SCG size. This performance is quite close to the reference method with SCG size of 1 RB which requires 4 times fronthaul capacity to send the channel data. When calculating BFWs on 4 subcarriers per SCG, the method according to embodiments herein only has the performance slightly improved comparing to the 2-subcarrier-per-SCG case. It shows that the performance gets closer to the benchmark case where the channel data on every subcarrier is sent and more BFWs are calculated. Thus, with the simulated channel realizations, calculating BFWs on 2 subcarriers for the method according to embodiments herein would be enough from the performance perspective.

To perform the method actions above, the BBU 111 is configured to assist the RU, to perform beamforming for a communication between the UE 120 and the base station 110 in the wireless communications network 100 using a multiple antenna system for communication. The BBU 111 and the RU 112 are adapted to be associated with the base station 110. The BBU 111 may comprise an arrangement depicted in FIGS. 9a and 9b.

The BBU 111 may comprise an input and output interface 900 configured to communicate with other network entities such as the RU 112. The input and output interface 900 may comprise a wireless receiver (not shown) and a wireless transmitter (not shown).

The BBU 111 may further be configured to, e.g. by means of an obtaining unit 910 in the BBU 111, obtain channel taps related to a number of subcarriers.

The BBU 111 may further be configured to, e.g. by means of the obtaining unit 910 in the BBU 111, obtain frequency domain channel values related to each respective subcarrier out of a number of subcarriers, and frequency domain channel values transformed into channel taps by a mathematical transformation.

The BBU 111 may further be configured to, e.g. by means of a selecting unit 920 in the BBU 111, select a subset of the channel taps.

The BBU 111 may further be configured to, e.g. by means of the selecting unit 920 in the BBU 111, select the subset of the channel taps by anyone out of:

selecting the subset of the channel taps firstly in a beam-domain, then in a tap-domain, selecting the subset of the channel taps firstly in a tap-domain, then in a beam-domain, and selecting the subset of the channel taps with respect to a joint beam-tap-domain.

The BBU 111 may further be configured to, e.g. by means of a sending unit 930 in the BBU 111, send to the RU 112, the selected subset of the channel taps and information identifying the selected subset of channel taps. The selected subset of channel taps and information identifying the selected subset of channel taps will assist the RU 112 to perform beamforming for the communication between the UE 120 and the base station 110.

In some embodiments, the number of subcarriers is adapted to comprise any one out of:

subcarriers corresponding for the whole bandwidth used for the communication with the UE 120, or subcarriers corresponding to the bandwidth for the UE 120 scheduled for the next Transmission Time Interval, TTI in the communication.

In some embodiments, the obtaining of the channel taps is adapted to be performed by transforming the frequency domain channel values into the channel taps by a mathematical transformation.

In some embodiments, the frequency domain channel values are adapted to be obtained based on any one or more out of.

channel estimation in any one out of: an element-domain or a beam-domain, and reference signals transmitted by the UE 120.

In some embodiments, the subset of the channel taps is adapted to be selected according to anyone or more out of:

based on values of the channel taps, based on power and/or amplitude values of the channel taps, and based on a threshold value of power and/or amplitude of the channel taps.

Figure 9A:
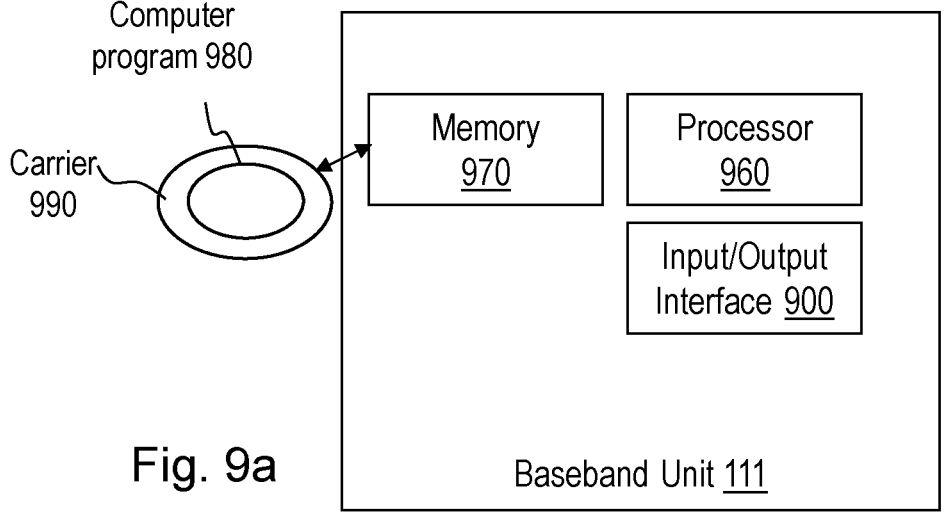
FIG. 9*a-b* are schematic block diagrams illustrating embodiments of a BBU.
Figure 9B:
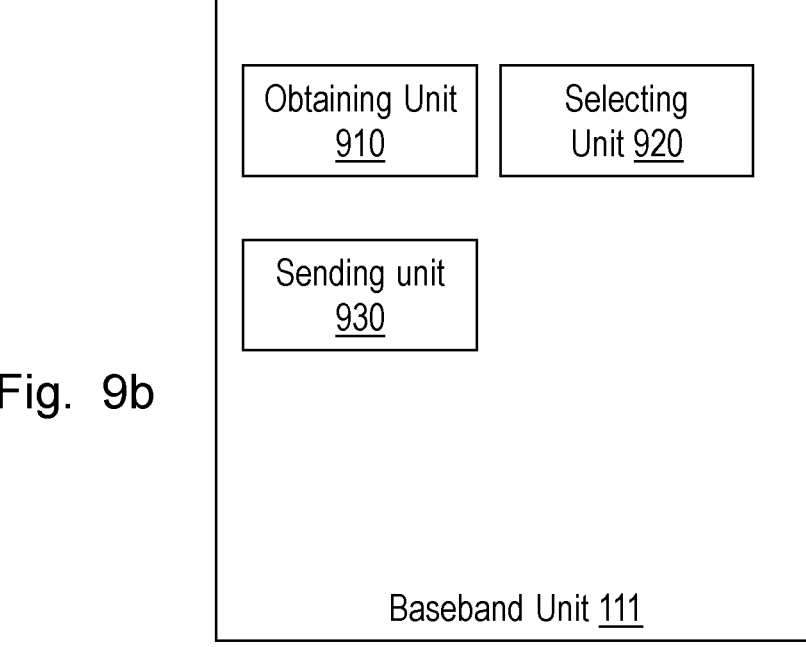

The embodiments herein may be implemented through a respective processor or one or more processors, such as the processor 960 of a processing circuitry in the BBU 111 depicted in FIG. 9*a*, together with respective computer program code for performing the functions and actions of the embodiments herein. The program code mentioned above may also be provided as a computer program product, for instance in the form of a data carrier carrying computer program code for performing the embodiments herein when being loaded into the BBU 111. One such carrier may be in the form of a CD ROM disc. It is however feasible with other data carriers such as a memory stick. The computer program code may furthermore be provided as pure program code on a server and downloaded to the BBU 111.

The BBU 111 may further comprise a memory 970 comprising one or more memory units. The memory 970 comprises instructions executable by the processor in BBU 111. The memory 970 is arranged to be used to store e.g. information, indices, channel data, indications, data, configurations, and applications to perform the methods herein when being executed in the BBU 111.

In some embodiments, a computer program 980 comprises instructions, which when executed by the respective at least one processor 960, cause the at least one processor of the BBU 111 to perform the actions above.

In some embodiments, a respective carrier 990 comprises the respective computer program 980, wherein the carrier 990 is one of an electronic signal, an optical signal, an electromagnetic signal, a magnetic signal, an electric signal, a radio signal, a microwave signal, or a computer-readable storage medium.

Those skilled in the art will appreciate that the units in the BBU 111 described above may refer to a combination of analog and digital circuits, and/or one or more processors configured with software and/or firmware, e.g. stored in the BBU 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

To perform the method actions above, the RU 112 is configured to perform beamforming fora communication between the UE 120 and the base station 110 in the wireless communications network 100 using a multiple antenna system for communication. The RU 112 is adapted to be associated with the base station 110. The RU 112 may comprise an arrangement depicted in FIGS. 10*a* and 10*b*.

The RU 112 may comprise an input and output interface 1000 configured to communicate with other network entities such as the UE 120 and the BBU 111. The input and output interface 1000 may comprise a wireless receiver (not shown) and a wireless transmitter (not shown).

The RU 112 may further be configured to, e.g., by means of a receiving unit 1010 in the RU 112, receive from the BBU 111 associated with the base station 110, a subset of channel taps selected by the BBU 111, and information identifying the selected subset of channel taps.

The RU 112 may further be configured to, e.g., by means of a reconstructing unit in the RU 112, reconstruct the channel taps in the tap domain based on the information identifying the selected subset of channel taps.

The RU 112 may further be configured to, e.g., by means of the reconstructing unit 1020 in the RU 112, reconstruct the channel taps in the tap domain, by filling zeros at the positions of the unselected channel according to the received information identifying the selected subset of channel taps.

The RU 112 may further be configured to, e.g., by means of a transforming unit in the RU 112, transform by a mathematical transformation, at least some of the channel taps out of the set of channel taps, to obtain corresponding frequency domain channel values related to respective subcarriers out of a number of subcarriers.

The RU 112 may further be configured to, e.g., by means of a determining unit in the RU 112, determine respective Beamforming Weights, BFWs, according to the obtained frequency domain channel values, on the respective subcarriers out of the number of subcarriers, and The RU 112 may further be configured to, e.g., by means of the determining unit in the RU 112, determine the respective BFWs according to the obtained frequency domain channel values, on the respective subcarriers out of the number of subcarriers by: calculating BFWs according to the obtained frequency domain channel values for at least part of the respective subcarriers out of the number of subcarriers, and if not BFWs on all subcarriers of the number of subcarriers has been calculated, obtaining BFWs on the remaining sub-carriers based on the calculated BFWs.

The RU 112 may further be configured to, e.g., by means of a performing unit in the RU 112, perform beamforming with the determined BFWs on the respective subcarriers out of the number of subcarriers for the communication between the UE 120 and the base station 110.

In some embodiments, the BFWs on the remaining sub-carriers are adapted to be obtained by anyone or more out of:

repeating the calculated BFWs for neighboring sub-carriers of the remaining sub-carriers, interpolating the calculated BFWs for the remaining sub-carriers.

The embodiments herein may be implemented through a respective processor or one or more processors, such as the processor 1060 of a processing circuitry in the RU depicted in FIG. 10*a*, together with respective computer program code for performing the functions and actions of the embodiments herein. The program code mentioned above may also be provided as a computer program product, for instance in the form of a data carrier carrying computer program code for performing the embodiments herein when being loaded into the RU 112. One such carrier may be in the form of a CD ROM disc. It is however feasible with other data carriers such as a memory stick. The computer program code may furthermore be provided as pure program code on a server and downloaded to the RU 112.

The RU 112 may further comprise a memory 1070 comprising one or more memory units. The memory 1070 comprises instructions executable by the processor in RU 112. The memory 1070 is arranged to be used to store e.g., information, channel data, indices, indications, data, configurations, and applications to perform the methods herein when being executed in the RU 112.

In some embodiments, a computer program 1080 comprises instructions, which when executed by the respective at least one processor 1060, cause the at least one processor of the RU 112 to perform the actions above.

In some embodiments, a respective carrier 1090 comprises the respective computer program 1080, wherein the carrier 1090 is one of an electronic signal, an optical signal, an electromagnetic signal, a magnetic signal, an electric signal, a radio signal, a microwave signal, or a computer-readable storage medium.

Those skilled in the art will appreciate that the units in the RU 112 described above may refer to a combination of analog and digital circuits, and/or one or more processors configured with software and/or firmware, e.g., stored in the RU 112, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 11:
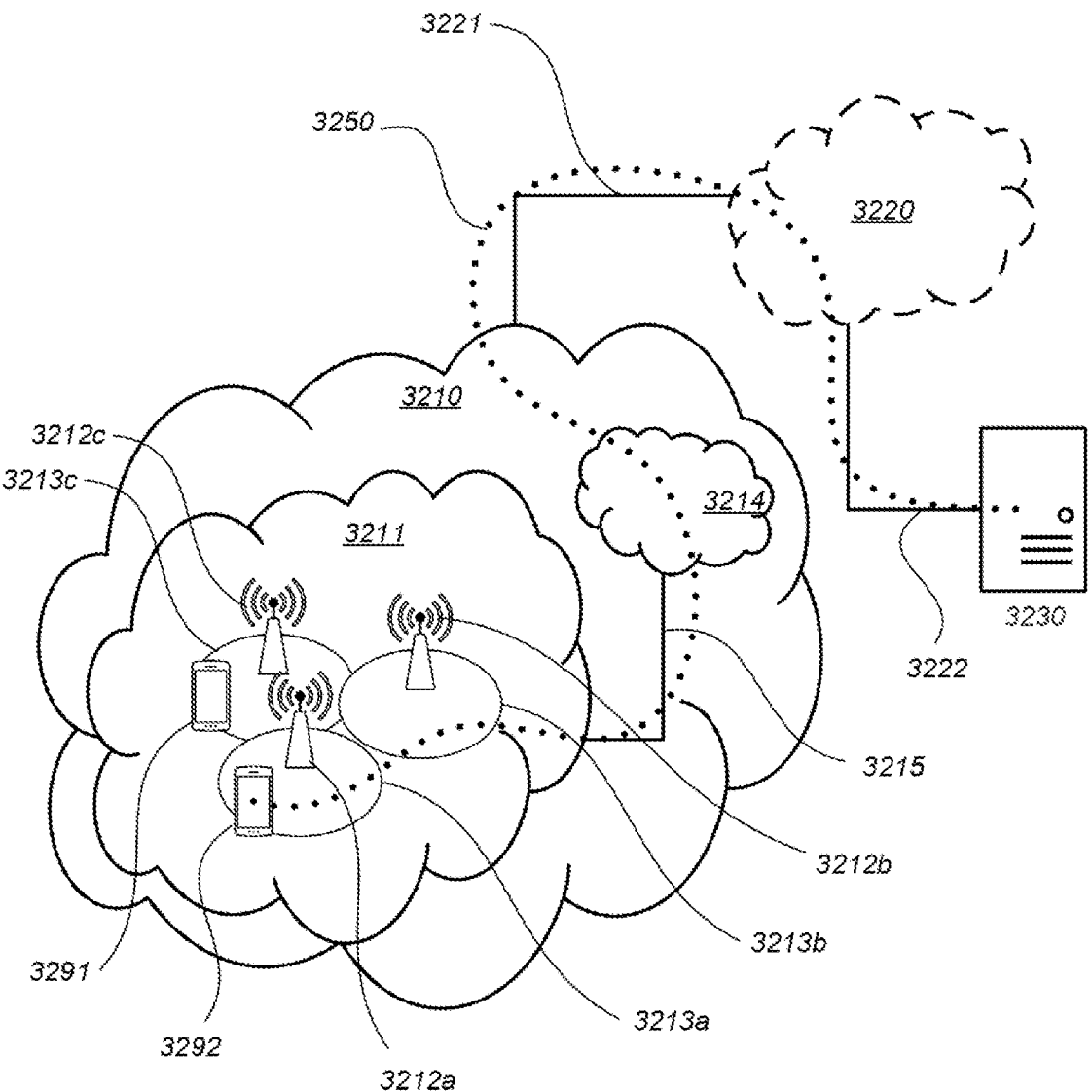
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, e.g., wireless communications network 100, which comprises an access network 3211, such as a radio access network, and a core network 3214. The access network comprises a plurality of base stations 3212a, 3212b, 3212c, such as AP STAs NBs, eNBs, gNBs, e.g., base station 110, or other types of wireless access points, each defining a corresponding coverage area 3213a, 3213b, 3213c. Each base station 3212a, 3212b, 3212c is connectable to the core network 3214 over a wired or wireless connection 3215. A first UE such as a Non-AP STA 3291, e.g. UE 120, located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer

3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 12 may be identical to the host computer 3230, one of the base stations 3212*a*, 3212*b*, 3212*c* and one of the UEs 3291, 3292 of FIG. 11, respectively. This is to say, the inner workings of these entities may be as shown in FIG. 12 and independently, the surrounding network topology may be that of FIG. 11.

Figure 12:
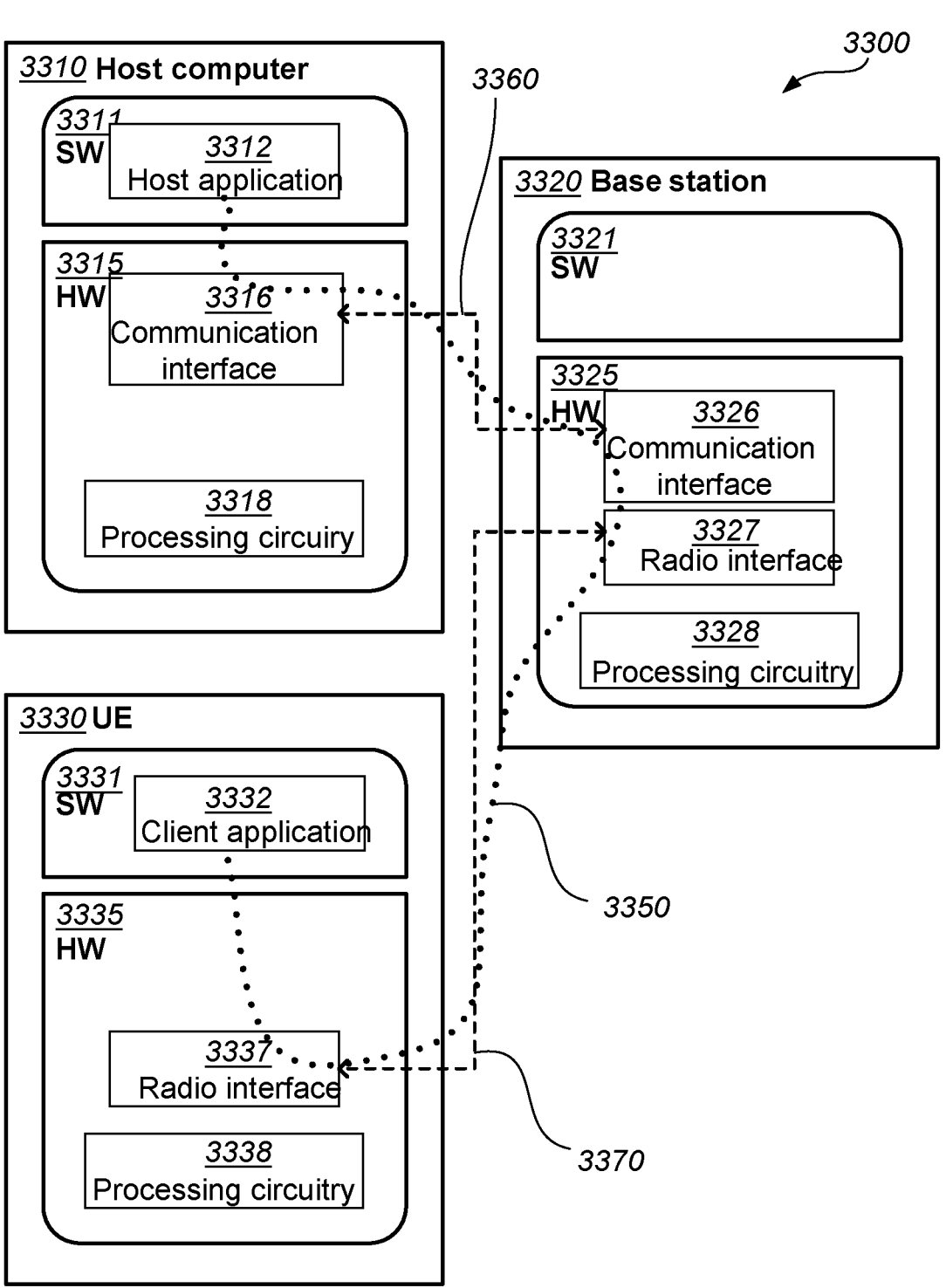
FIG. 12 is a generalized block diagram of a host computer communicating via a base station with a user equipment over a partially wireless connection.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing, e.g., on the basis of load balancing consideration or reconfiguration of the network.

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection forms the last segment. More precisely, the teachings of these embodiments may improve the RAN effect: data rate, latency, power consumption and thereby provide benefits such as corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 13, 14:
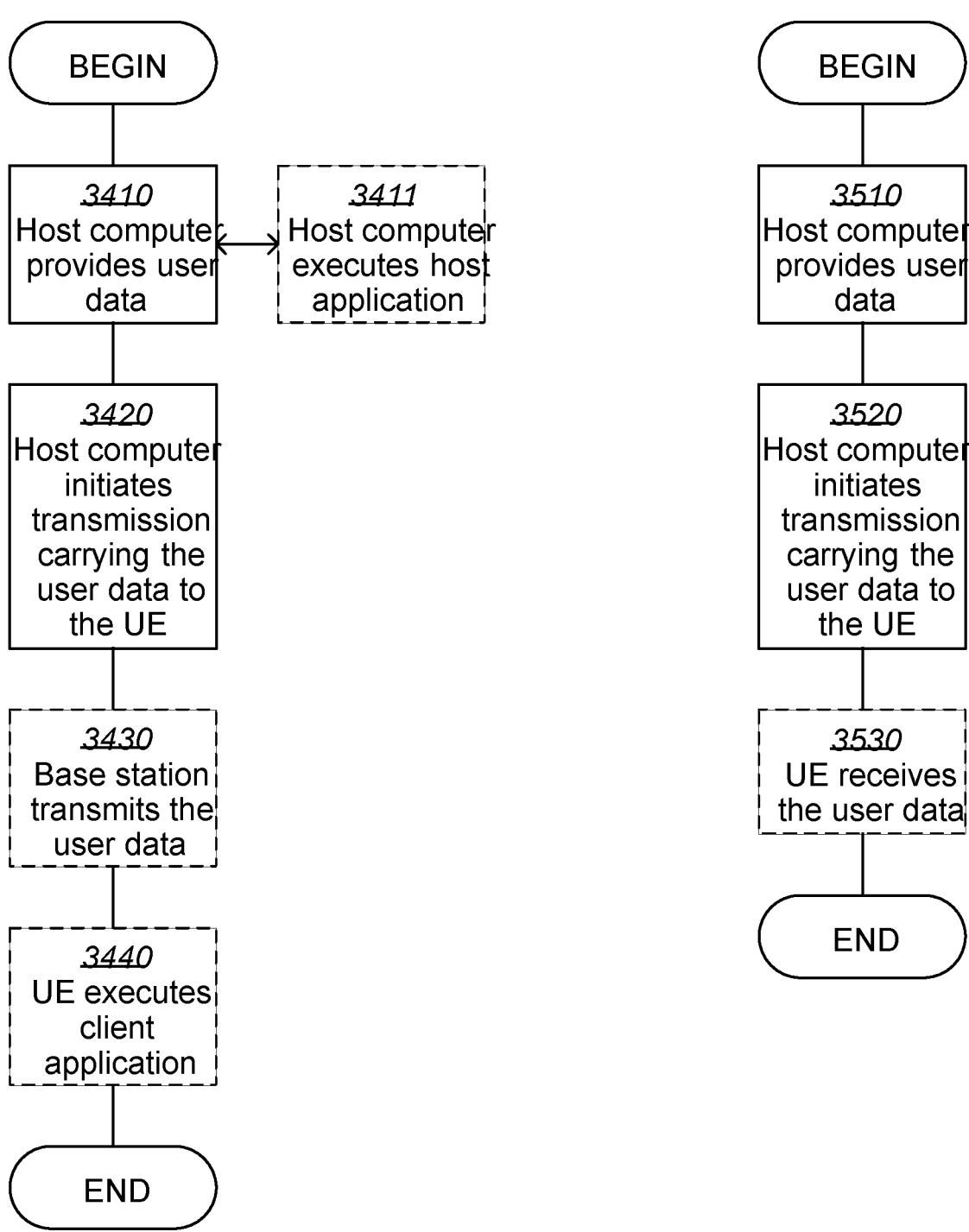
FIGS. 13-16 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 13 will be included in this section. In a first step 3410 of the method, the host computer provides user data. In an optional substep of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 15, 16:
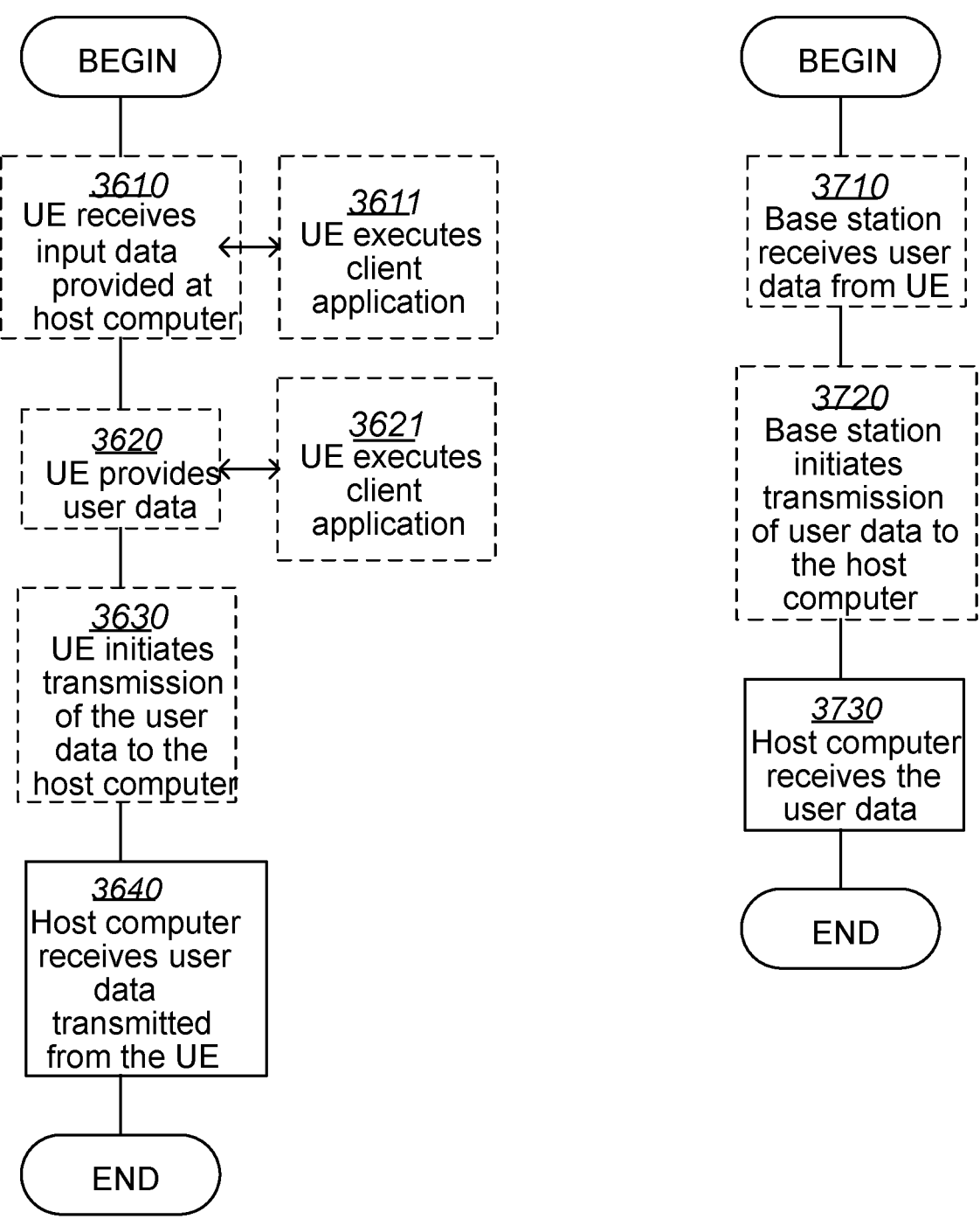

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a Radio Unit, RU, (112) for performing beamforming for a communication between a User Equipment, UE, (120) and a base station (110) in a wireless communications network (100) adapted to use a multiple antenna system for communication, wherein the RU (112) is associated with the base station (110), the method comprising:

receiving (401) from a Base Band Unit, BBU, (111) associated with the base station (110), via a fronthaul interface, a subset of channel taps selected by the BBU (111) from a larger set of channel taps to reduce required fronthaul capacity, and information identifying the selected subset of channel taps to enable reconstruction of the channel taps in the tap domain;

reconstructing (402) the channel taps in the tap domain by using the information identifying the selected subset of channel taps to determine positions of the selected channel taps within a complete set of channel taps;

transforming (403) by a mathematical transformation comprising an inverse discrete Fourier transform (IDFT) or inverse discrete cosine transform (IDCT), at least some of the channel taps out of the set of channel taps, to obtain corresponding frequency domain channel values related to respective subcarriers out of a number of subcarriers;

determining (404) respective Beamforming Weights, BFWs, according to the obtained frequency domain channel values, on the respective subcarriers out of the number of subcarriers; and performing (405) beamforming with the determined BFWs on the respective subcarriers out of the number of subcarriers for the communication between the UE (120) and the base station (110).

2. The method according to claim 1, wherein the reconstructing (402) the channel taps in the tap domain, is performed by filling zeros at the positions of the unselected channel taps according to the received information identifying the selected subset of channel taps.

3. The method according to claim 1, wherein the determining (404) of the respective BFWs according to the obtained frequency domain channel values, on the respective subcarriers out of the number of subcarriers comprises:

calculating BFWs according to the obtained frequency domain channel values for at least part of the respective subcarriers out of the number of subcarriers; and if not BFWs on all subcarriers of the number of subcarriers has been calculated, obtaining BFWs on the remaining sub-carriers based on the calculated BFWs.

4. The method according to claim 3, wherein the BFWs on the remaining subcarriers are obtained by anyone or more out of:

repeating the calculated BFWs for neighboring sub-carriers of the remaining sub-carriers; and interpolating the calculated BFWs for the remaining sub-carriers.

5. A computer program (1080) comprising instructions, which when executed by a processor (1060), causes the processor (1060) to perform actions according to claim 1.

6. A carrier (1090) comprising the computer program (1080) of claim 5, wherein the carrier (1090) is one of an electronic signal, an optical signal, an electromagnetic signal, a magnetic signal, an electric signal, a radio signal, a microwave signal, or a computer-readable storage medium.

* * * * *